US010049380B2

(12) United States Patent
Asur et al.

(10) Patent No.: US 10,049,380 B2
(45) Date of Patent: Aug. 14, 2018

(54) CONTROVERSY DETECTOR

(71) Applicant: HEWLETT-PACKARD DEVELOPMENT COMPANY, L.P., Houston, TX (US)

(72) Inventors: Sitaram Asur, Mountain View, CA (US); Rumi Ghosh, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 637 days.

(21) Appl. No.: 14/487,976

(22) Filed: Sep. 16, 2014

(65) Prior Publication Data

US 2016/0078472 A1  Mar. 17, 2016

(51) Int. Cl.
*G06F 17/30* (2006.01)
*G06Q 30/02* (2012.01)

(52) U.S. Cl.
CPC ............... *G06Q 30/0245* (2013.01)

(58) Field of Classification Search
CPC .......... G06F 17/30864; G06Q 30/0217; G06Q 30/0245; G06Q 30/02
USPC ................... 707/722, 723; 725/13
See application file for complete search history.

(56) References Cited

U.S. PATENT DOCUMENTS

| | | | |
|---|---|---|---|
| 8,676,913 B1 | 3/2014 | Roche et al. | |
| 9,105,008 B2 * | 8/2015 | Popescu et al. | |
| 2008/0294516 A1 | 11/2008 | Leader et al. | |
| 2010/0161382 A1 * | 6/2010 | Cole | 705/10 |
| 2012/0136985 A1 * | 5/2012 | Popescu et al. | 709/224 |
| 2012/0144413 A1 | 6/2012 | Wang et al. | |
| 2012/0323647 A1 | 12/2012 | Klooster | |
| 2013/0060757 A1 * | 3/2013 | Myslinski | 707/722 |
| 2013/0080266 A1 * | 3/2013 | Molyneux et al. | 705/14.72 |

OTHER PUBLICATIONS

Lund et al., Immunological Bioinformatics, 2005, 98-101.*
Suersdorfer et al~"Analyzing and Mining Comments and Comments Ratings on the Social Web" ~ ACM ~ 2014 ~ 40 Pages.
Weber etal ~ "Mining Web Query Logs to Analyze Political Issues" ~ WebSci~ Jun. 2012 ~ 10 pages.

* cited by examiner

*Primary Examiner* — Jean B Fleurantin
(74) *Attorney, Agent, or Firm* — Hewlett Packard Enterprise Patent Department

(57) ABSTRACT

In the examples provided herein, a controversy detection system includes a classifier engine to classify each of a plurality of comments about a publication as controversial or non-controversial. The system also includes a controversy detector engine to determine, based on the classification of the plurality of comments, whether the publication is controversial or non-controversial.

13 Claims, 6 Drawing Sheets

CONTROVERSY DETECTOR

BACKGROUND OF THE INVENTION

An advertising campaign, which can include advertisements for presentation on television or over the internet, can be used by a company to promote its brand, products, and services. However, the content or message of certain advertisements can create controversy, resulting in consumers negatively perceiving the company and/or product. In extreme cases, a negatively perceived advertisement can prompt a boycott of the product or brand being promoted by the advertisement.

BRIEF DESCRIPTION OF THE DRAWINGS

The accompanying drawings illustrate various examples of the principles described below. The examples and drawings are illustrative rather than limiting.

DETAILED DESCRIPTION

Described in detail below is a computer-implemented method of automatically detecting whether a publication is controversial or non-controversial. The method involves extracting semantic and linguistic features from comments about the publication to construct a classifier to automatically identify controversial comments with accuracy. Based on the percentage of comments that are controversial, it can be determined whether the publication will generate controversy.

Advertising campaigns are used by companies for promoting their brand, products, and services. A consumer's perceptions of an advertising campaign may have a significant impact on the consumer's decision to accept or reject certain advertised products and/or brands. In some cases, to generate brand awareness, increase popularity, and tackle intense competition, advertising agencies aim to develop ads that resonate with a majority of the population. Thus, a large portion of marketing expenses are spent in developing and distributing advertisements for running on television or the Internet.

In recent times, with the advent of online distribution channels and video-sharing services like YouTube™, once a recording of a televised advertisement is posted on a social media website (like YouTube™), it not only allows for continued viewership over time, but also serves as a barometer of public reaction toward the advertisement. Further, it also facilitates user sharing of content virally and enables advertisements to gain significant popularity. On the other hand, the inability to control user generated data in online social media websites can be detrimental, as it permits the unauthorized spread of potentially damaging content.

Currently, companies rely on test audiences to reveal potential issues with advertisements. Additionally, there are no well-defined rules in for determining what makes something controversial. Thus, automatic controversy detection would help in marketing, increasing popularity, and cultivating a desired brand image. Described below are techniques for developing an automatic mechanism for early detection of controversy in advertisements using user generated data.

Figure 1:
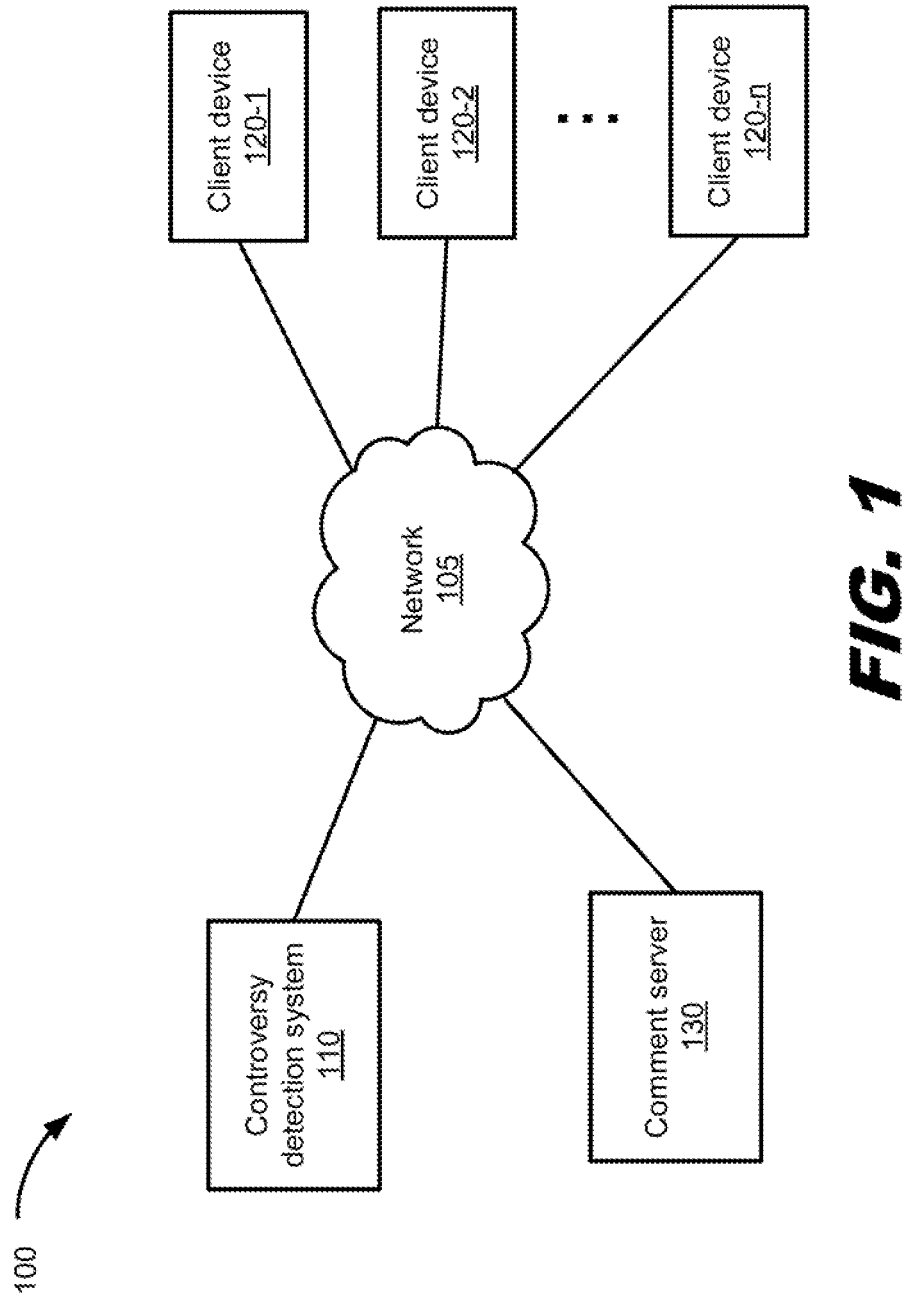
FIG. 1 depicts a block diagram of an example environment including a controversy detection system.

FIG. 1 depicts a block diagram of an example system 100 in which a controversy detection system 110 can evaluate comments provided by commenters on an advertisement or on any document or publication disseminated to the public, such as a book or newspaper article. For ease of discussion, in the following, the term publication can refer to any advertisement (text, video, audio, or multimedia); video; recording; text publication; multimedia publication (live or recorded); text document; and any other document of any type released to the public.

In some instances, the commenters can provide comments by using electronic client devices 120. The client devices 120 used by commenters for providing comments can be any system and/or device that is able to establish a connection, whether wired or wireless, with a comment server 130. Client devices 120 can include one or more input mechanisms, such as a keyboard, touch screen, mouse, pointer, and keypad. For example, client devices 120 can be a handheld device, a laptop computer, or a desktop computer. In some cases, the client devices 120 communicate with the comment server 130 over a network 105. The network 105 can be any type of network, such as the Internet, or an intranet. Alternatively or additionally, one or more of the client devices 120 can be directly coupled to the comment server 130.

While commenters can use electronic client devices 120 to provide an electronic comment on a digital forum, as discussed above, commenters can alternatively provide comments via any other method, such as by hard copy, for example, through a postal mail system, or as an audio or video message. The techniques presented below are applicable to comments made by commenters via any method, although receiving comments electronically or via a recorded message makes the comments available to the controversy detection system 110 more quickly than via a postal mail system.

The comment server 130 can provide an electronic forum for users to provide comments about a particular publication. In some cases, the comment server 130 can provide access to the publication to members of the public in addition to receiving comments from the public. For example, the comment server 130 can serve a Super Bowl advertisement to requesters, and also provide the electronic forum to receive and make accessible comments posted about the advertisement. An advantage to having an electronic forum is that commenters can provide immediate feedback after accessing a publication, and the controversy detection system 110 can evaluate the provided comments rapidly, soon after the comments have been provided and collected for analysis. Additionally, an electronic forum accessible over the Internet provides opportunity for commenters 120 from various backgrounds, from any location, socio-economic background, country, etc. to provide comments. In fact, the more varied the background of the commenters, the more accurate the results of the controversy detection analysis of the publication that the controversy detection system 120 will generate.

Figure 2:
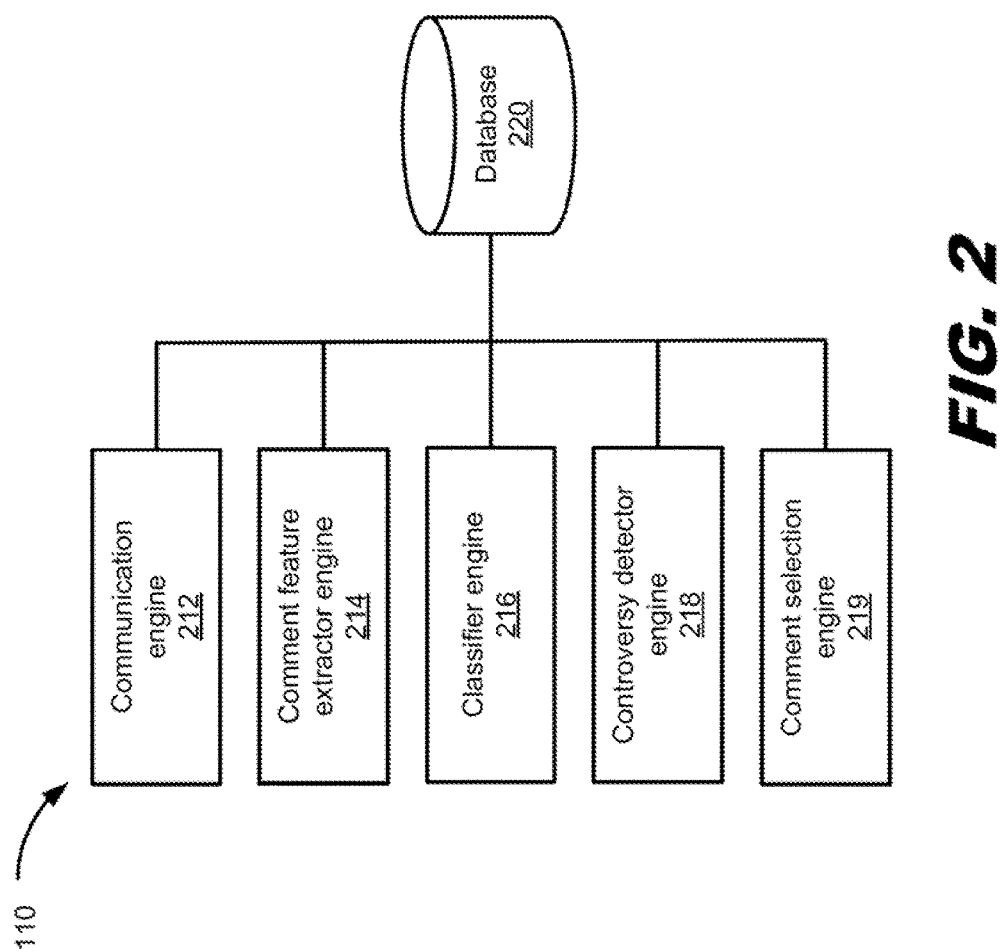
FIG. 2 depicts a block diagram of an example controversy detection system.

FIG. 2 depicts a block diagram of the example controversy detection system 110. The controversy detection system 110 can include a communication engine 212, a comment feature extractor engine 214, a classifier engine 216, a controversy detector engine 218, and a comment selection engine 219. Each of the engines 212, 214, 216, 218, 219 can interact with a database 220.

Communication engine 212 is to receive comments contributed by commenters that pertain to a particular publication, and store the comments in a memory or database. Communication engine 212 may also receive a signal to trigger the analysis of the comments to determine whether the publication is controversial or non-controversial and to provide as an output an indication whether the publication was determined to be controversial or non-controversial.

The comment feature extractor engine 214 is to extract content-based features, such as semantic features, linguistic style features, visual features, audio features, and work-ontologies, from the comments. These extracted features are subsequently used by the classifier engine 216.

In some implementations, over two thousand semantic and linguistic style features can be associated with a comment and extracted. In one implementation, semantic and linguistic style features can be grouped into five categories: term frequency-inverse document frequency (tf-idf), latent topics, n-gram, word statistic features, and frequency of controversial issues.

With tf-idf, all text from the selected comments are put together, excluding stop-words. Then tf-idf is used as the weighting schema. tf-idf allows words to be emphasized that are most discriminative for a category. These words include emoticons present in the text of written comments.

For the latent topics category, topic modeling approaches can identify topics in large collections of documents, or comments, in this case. Latent Dirichlet allocation (LDA) is a basic topic modeling algorithm. An LDA model is fit to training documents, where each document is a user comment on a particular publication. The number of topics (e.g., T=100) is empirically fixed by estimating the log likelihood of a model with T=50, 100, 150, 200, 250, 300 on held out data. Default hyper-parameters ($\alpha$=50/T, $\beta$=0.01) are initially selected and optimized during the training by using Wallach's fixed point iteration method. Using collapsed Gibbs sampling for inference, many iterations of the Markov chain (which consists of topic assignment for a token in the training corpus given the assignment of all the other tokens) are performed until the topic assignments seem to potentially converge (at approximately 2000 iterations). As a result, estimates of the word distribution of topics ($\hat{z}$) and the topic distribution of documents ($\overline{\theta}$) are obtained. The estimated distributions $\hat{z}$ and $\overline{\theta}$ are predictive distributions and are used to infer the topic distribution for each user comment in a training and test corpus.

Regarding the n-gram category, taking single words as features does not help to map the complete information present in the comments into features. For example, the bigram "not funny" has a different semantic interpretation and meaning than the unigram "funny." Thus, n-grams help characterize additional linguistic patterns that are not captured by just taking single words or unigrams into account. Bi-grams and trigrams delimited by whitespaces are extracted as additional features.

For word statistic features, statistical features, such as the number of words in a comment and the average length of words in each comment, are included.

Finally, for the category relating to the frequency of controversial issues, a lexicon of terms commonly interpreted as controversial is used, for example, issues deemed controversial by the web community can be found in a Wikipedia entry on controversial issues. Controversial issues can include abortion, African-American, communism, gun control, etc.

The classifier engine 216 is to perform supervised classification on the features extracted by the comment feature extractor engine 214 when the comments are part of a training data set, and to generate a classifier to classify comments about a publication as either controversial or non-controversial. In some implementations, the classifier engine 216 can use logistic regression, random forest, and/or any other type of classification technique. Logistic regression provides an understanding of the relative importance of two categories of features. Methods for evaluating applied classification techniques with the features include F-measure, receiver operating characteristic (ROC) curve, and Matthews Correlation Coefficient (MCC).

The classifier engine 216 further performs feature selection for any combination of category of features. For example, information gain can be used for feature selection by taking the top N features for classification and evaluating the classification performance. The area under the ROC curve can be used as an evaluation metric.

For an example feature classification task using a training data set, comments associated with controversial terms may be labeled as true, and the rest may be labeled as false. To gain an understanding of controversial terms associated with user comments, the controversial term features may be ranked in descending order based on their odds ratios. The algorithm predicts a high likelihood of the top features to be contained in controversial advertisements. Highly ranked terms fall into several main categories of features that have a high likelihood of being associated with controversy: racist, religious, sexual, choice, negative terms, political, violent, humor, finance, and abusive.

As a result of supervised classification of the comments in the training data sets, the classifier engine 216 generates a classifier that can be used for classifying other comments not in the training data sets. Thus, the classifier engine 216 can also classify comments about a publication as controversial or non-controversial.

After the classifier engine 216 has classified a set of comments about a publication as controversial or non-controversial, the controversy detector engine 218 is to calculate a C-score, i.e., a controversy score, from the classified comments. The C-score for a publication is the fraction of comments about the publication that are classified as controversial, and the C-score is used as an indicator of the probability that a publication is controversial. For example, a C-score of 0.3 or greater may indicate a publication is likely to be controversial (greater than 90%). While the cutoff C-score for determining whether a particular publication is controversial may vary from 0.3, the cutoff C-score can be predetermined for a particular type of publication, and the controversy detector engine 218 identifies a publication as controversial if the C-score is above the predetermined cutoff value. That is, the controversy detector engine 218 determines based on comment classification of comments about the publication whether the publication is controversial or non-controversial.

In some implementations, the comment selection engine 219 is to select the comments about the publication from a larger set of comments about the publication. In some cases, the selected comments are based upon time of entry of the comments such that the selected comments have been contributed within a certain period of time after the publication has initially been published. The period of time is dependent on how long it takes a diverse set of commenters with differing points of view to contribute comments. For example, in the case of a Super Bowl advertisement watched by over a hundred million viewers on television, it may be sufficient to select comments contributed within the first twenty-four hour period after the advertisement is shown because a large number of people have viewed the advertisement and had the opportunity to comment on an online forum within that period of time. In contrast, for the case of a print advertisement distributed in a weekly magazine, the comment period may be a week or more to ensure receiving comments from a large enough sample size of people who have seen the advertisement and have differing points of view.

Database 220 can store data, such as a particular publication, comments about the publication, whether each comment is classified as controversial or non-controversial, and whether the particular publication has been determined to be controversial or non-controversial.

Figure 3:
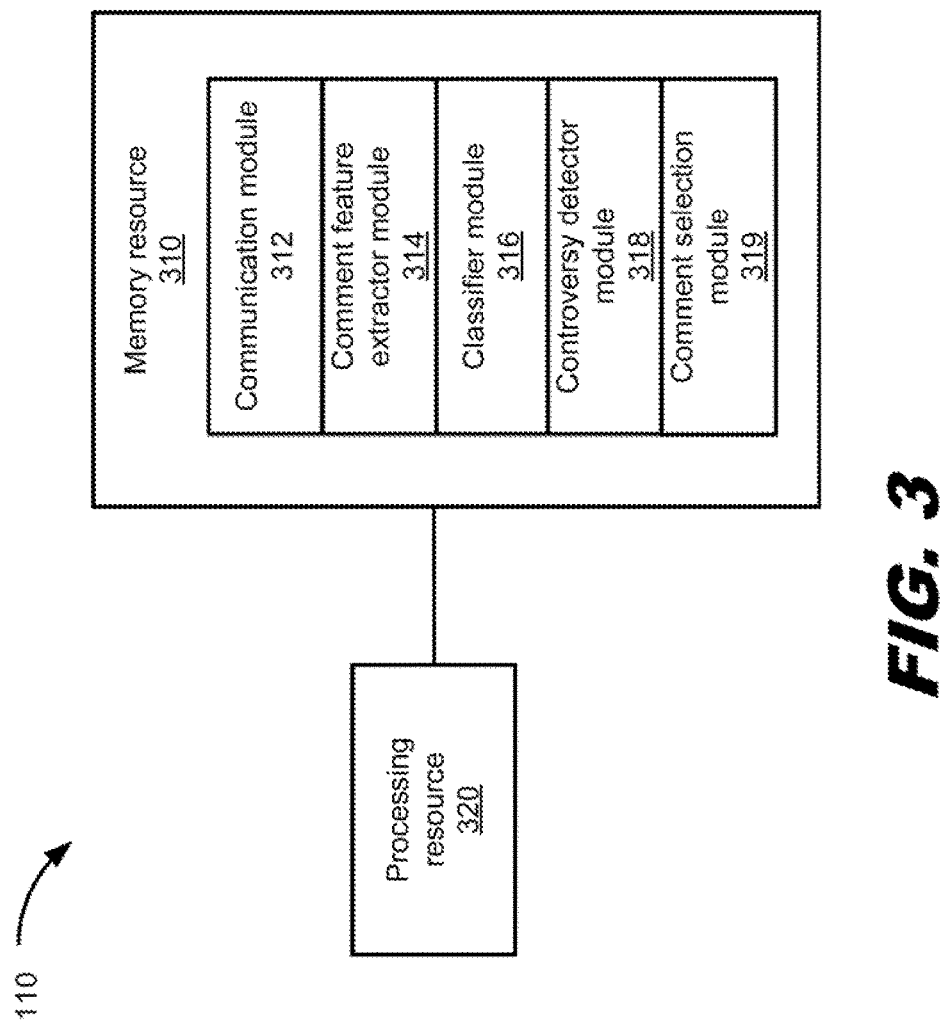
FIG. 3 depicts a block diagram of an example memory resource and an example processing resource to implement a controversy detection system.

In the above description, various components were described as combinations of hardware and programming. Such components may be implemented in different ways. Referring to FIG. 3, the programming may be processor executable instructions stored on tangible memory resource 310 and the hardware may include processing resource 320 for executing those instructions. Thus, memory resource 310 can store program instructions that when executed by processing resource 320, implements controversy detection system 110 of FIG. 2.

Memory resource 310 generally represents any number of memory components capable of storing instructions that can be executed by processing resource 320. Memory resource 310 is non-transitory in the sense that it does not encompass a transitory signal but instead is made up of one or more memory components that store the relevant instructions. Memory resource 310 may be implemented in a single device or distributed across devices. Likewise, processing resource 320 represents any number of processors capable of executing instructions stored by memory resource 310. Processing resource 320 may be integrated in a single device or distributed across devices. Further, memory resource 310 may be fully or partially integrated in the same device as processing resource 320, or it may be separate but accessible to that device and processing resource 320.

In one example, the program instructions can be part of an installation package that when installed can be executed by processing resource 320 to implement controversy detection system 110. In this case, memory resource 310 may be a portable medium such as a compact disc (CD), digital video disc (DVD), or flash drive or a memory maintained by a server from which the installation package can be downloaded and installed. In another example, the program instructions may be part of an application or applications already installed. Memory resource 310 can include integrated memory, such as a hard drive, solid state drive, or the like.

In the example of FIG. 3, the executable program instructions stored in memory resource 310 are depicted as communication module 312, comment feature extractor module 314, classifier module 316, controversy detector module 318, and comment selection module 319. Communication module 312 represents program instructions that when executed cause processing resource 320 to implement communication engine 212. Comment feature extractor module 314 represents program instructions that when executed cause processing resource 320 to implement comment feature extractor engine 214. Classifier module 316 represents program instructions that when executed cause processing resource 320 to implement classifier engine 216. Controversy detector module 318 represents program instructions that when executed cause processing resource 320 to implement controversy detector engine 218. Comment selection module 319 represents program instructions that when executed cause processing resource 320 to implement comment selection engine 219.

Figure 4A:
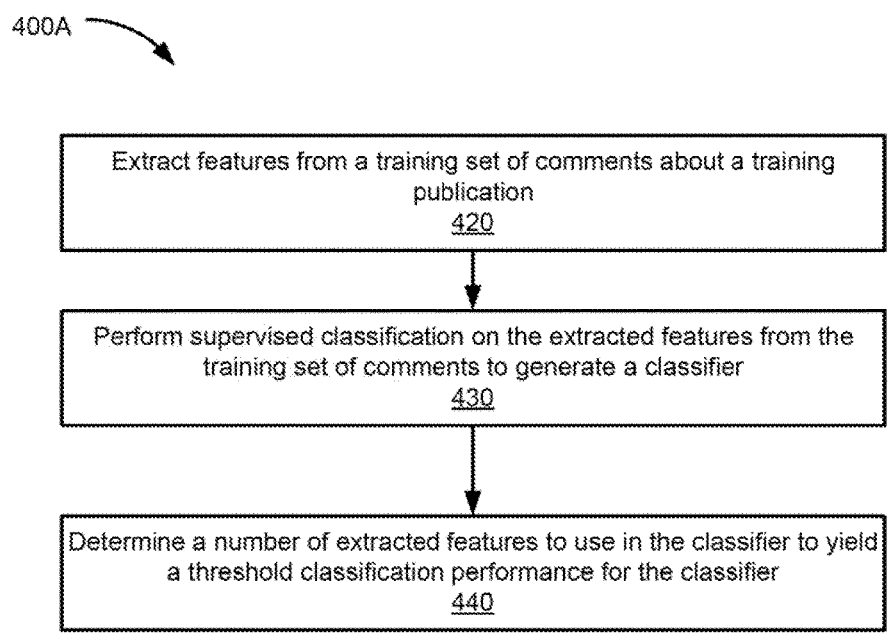
FIG. 4A depicts a flow diagram illustrating an example process of generating a classifier.

FIG. 4A depicts a flow diagram illustrating an example process 400A of generating a classifier. At block 420, the controversy detection system extracts features from a training set of comments about a training publication. The training set of comments is a training corpus. Examples of features include semantic features; linguistic features; visual features; audio features; and/or word ontologies. In some implementations, the features are grouped into categories, such as tf-idf, latent topics, n-gram, word statistic features, and frequency of a predetermined list of controversial issues, such as provided on Wikipedia.

At block 430, the controversy detection system performs supervised classification on the extracted features from the training set of comments to generate a classifier. In some implementations, the supervised classification uses one or more classification techniques, such as logistic regression and random forest. Logistic regression allows the relative importance of features in two categories to be identified. Evaluation metrics, such as E measure, ROC curve, and MCC, are used to evaluate the classifier.

At block 440, the controversy detection system determines a number of extracted features to use in the classifier to yield a classifier with a certain classification performance, or a threshold classification performance. The number of features used in the classifier is reduced by including the top N features in terms of information gain. In some implementations, the area under the ROC curve is used as the evaluation metric. A classifier is generated based on the respective categories of features with their corresponding number of features within the categories.

Blocks 420, 430, and 440 are performed using supervised classification to generate the classifier. The classifier is then applied to comments about a different publication, where the comments are not in a training data set.

Figure 4B:
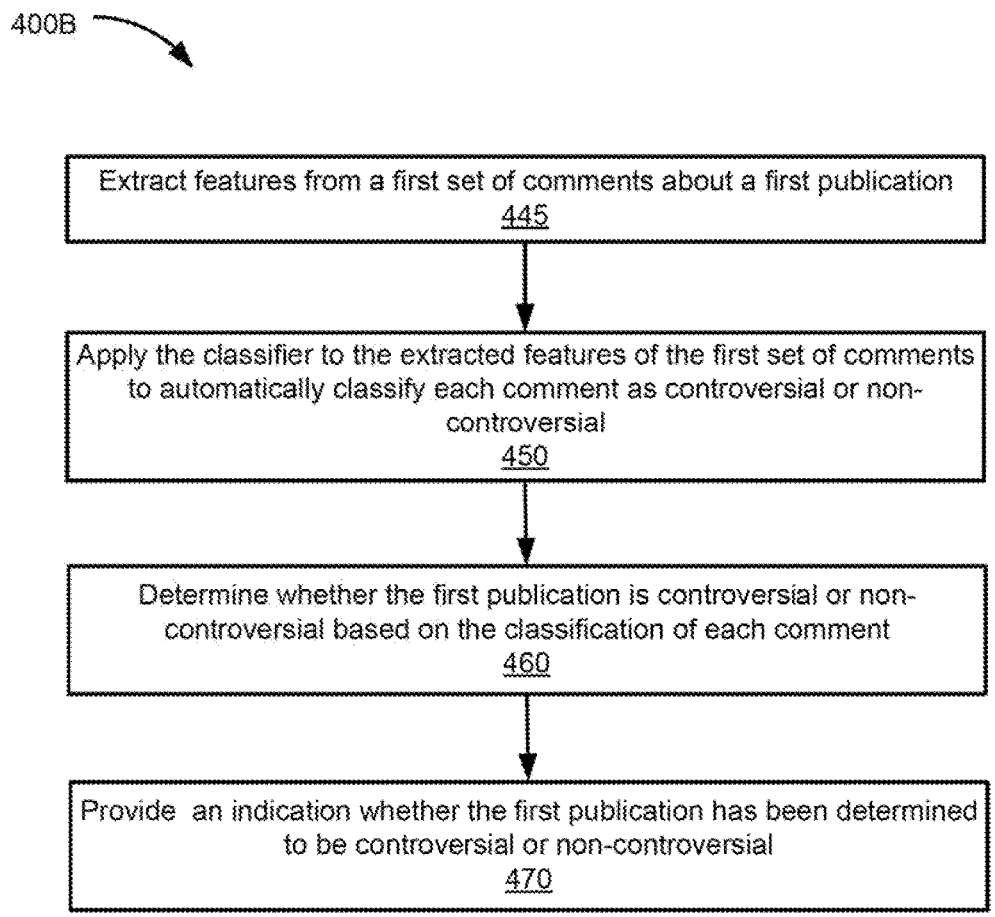
FIG. 4B depicts a flow diagram illustrating an example process of determining whether a publication is controversial or non-controversial.

FIG. 4B depicts a flow diagram illustrating an example process 400B of determining whether a publication is controversial or non-controversial. At block 445, the controversy detection system extracts features from a first set of comments about a first publication. And at block 450, the controversy detection system applies the generated classifier to the extracted features of the first set of comments to automatically classify each comment in the first set of comments as controversial or non-controversial. The first set of comments can be new data not from a training data set.

And at block 460, the controversy detection system determines whether the first publication is controversial or non-controversial based on the determination for each comment in the first set of comments. A ratio of the number of controversial comments to the total number of controversial and non-controversial comments is compared to a predetermined threshold value. If the ratio is greater than the threshold value, the first publication is considered controversial, otherwise, the publication is considered non-controversial.

At block 470, the controversy detection system provides as an output an indication whether the first publication has been determined to be controversial or non-controversial.

Figure 5:
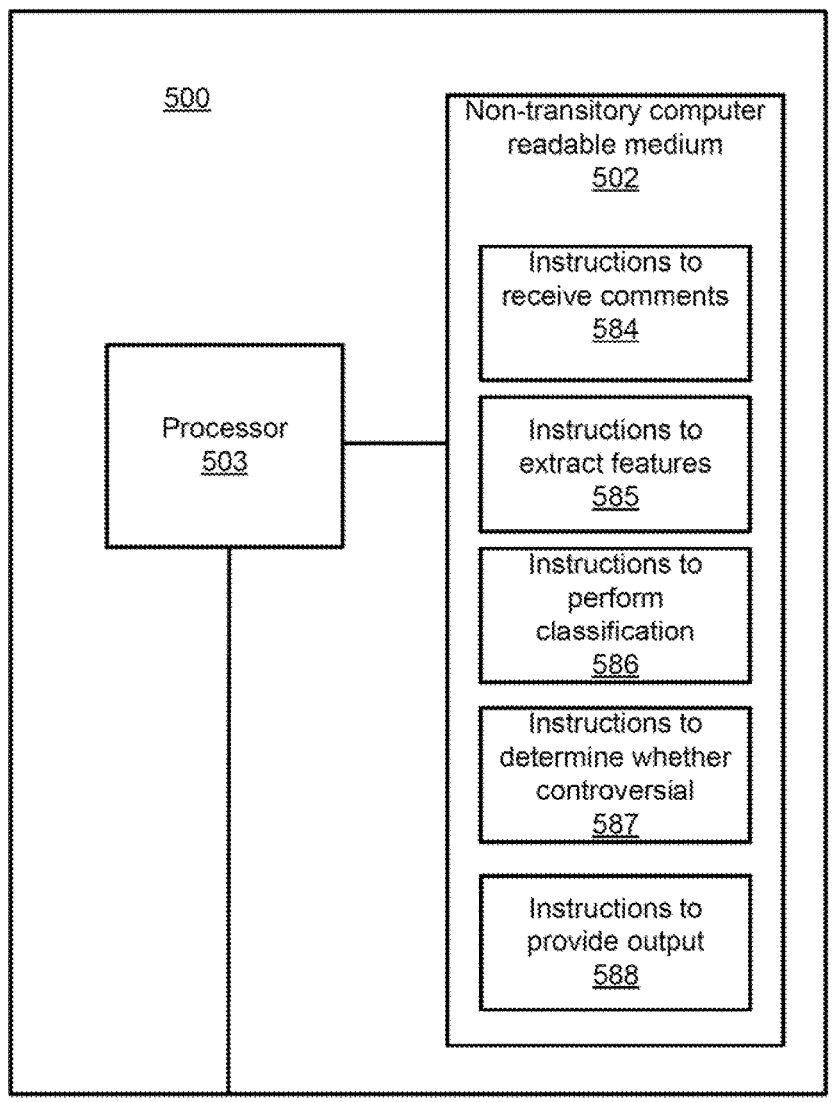
FIG. 5 depicts a block diagram of an example controversy detection system including a processor and a non-transitory computer readable medium.

FIG. 5 depicts a block diagram of an example system 500 including a processor 503 and a non-transitory computer readable medium 502 storing executable instructions according to the above disclosure. For example, the system 500 can be an implementation of the example controversy detection system 110 of FIG. 1.

The processor 503 can execute instructions stored on the non-transitory computer readable medium 502. For example, the non-transitory computer readable medium 502 can be any type of volatile or non-volatile memory or storage, such as random access memory (RAM), flash memory, read-only memory (ROM), storage volumes, a hard disk, or a combination thereof. When executed, the instructions can cause the processor 503 to perform a method of determining whether a publication is controversial or non-controversial, such as the method described with respect to FIG. 4B.

The example medium 502 can store instructions 584 executable by the processor 503 to receive and store a plurality of comments about a publication over an initial period after the publication is published. The comments may be received from an external device, such as a comment server 130, or another device that has collected the comments from the comment server 130.

The example medium 502 can further store instructions 585. The instructions 585 can be executable to extract features associated with the plurality of comments. In some examples, the processor 503 can execute instruction 585 to perform block 445 of the method of FIG. 4B.

The example medium 502 can further store instructions 586. The instructions 586 can be executable use the extracted features and a classifier to classify each of the plurality of comments as controversial or non-controversial. In some examples, the processor 503 can execute instruction 586 to perform block 450 of the method of FIG. 4B.

The example medium 502 can further store instructions 587. The instructions 587 can be executable to determine whether the publication is controversial based on a percentage of comments classified as controversial. In some examples, the processor 503 can execute instruction 587 to perform block 460 of the method of FIG. 4B.

The example medium 502 can further store instructions 588. The instructions 588 can be executable to provide as an output an indication whether the publication has been determined to be controversial or non-controversial. In some examples, the processor 503 can execute instruction 588 to perform block 470 of the method of FIG. 4B.

Not all of the steps, features, or instructions presented above are used in each implementation of the presented techniques.

What is claimed is:

1. A system comprising:
   a hardware processor; and
   a storage device storing instructions that, when executed by the hardware processor, cause the hardware processor to:
   receive, for each of a plurality of publications, a set of comments provided for the publication;
   receive training data that specifies controversial terms;
   for each comment included in each set of comments, identify i) at least one controversial term included in the comment, or ii) at least one non-controversial term included in the comment, the identification being based on the training data;
   generate a controversy classifier that i) accepts, as input, a particular set of comments for a particular publication and ii) produces, as output and for each comment in the particular set of comments, data indicating a measure of controversy for the particular comment;
   identify a second set of comments for a second publication, the second set of comments selected from a plurality of comments associated with the second publication based upon time of entry of each comment in the second set of comments after publication of the second publication;
   provide each comment in the second set of comments to the controversy classifier as input;
   determine, using output from the controversy classifier, that each comment in the second set of comments is controversial or non-controversial; and
   determine, based on the determinations made for each comment in the second set of comments, that the second publication is controversial or non-controversial.

2. The system of claim 1, wherein the instructions further cause the hardware processor to:
   extract content-based features from the set of comments.

3. The system of claim 2, wherein the extracted features are selected from the group comprising: semantic features, linguistic features, visual features, audio features, and word ontologies.

4. The system of claim 1, wherein the instructions further cause the hardware processor to:
   identify a second set of comments for a second publication;
   provide each comment in the second set of comments to the controversy classifier as input;
   determine, using output from the controversy classifier, that each comment in the second set of comments is controversial or non-controversial; and
   determine, based on the determinations made for each comment in the second set of comments, that the publication is controversial or non-controversial.

5. The system of claim 4, wherein the instructions further cause the hardware processor to determines that each comment in the second set of comments is controversial or non-controversial using logistic regression.

6. A computer implemented method comprising:
   receiving, for each of a plurality of publications, a set of comments provided for the publication;
   receiving training data that specifies controversial features;
   for each comment included in each set of comments, identifying i) at least one controversial feature included in the comment, or ii) at least one non-controversial feature included in the comment, the identification being based on the training data;
   generating a controversy classifier that i) accepts, as input, a particular set of comments for a particular publication and ii) produces, as output and for each comment in the particular set of comments, data indicating a measure of controversy for the comment;
   extracting features from a second set of comments about a second publication;
   applying the controversy classifier to the extracted features from the second set of comments to automatically classify each comment in the second set of comments as controversial or non-controversial;

determining whether the second publication is controversial or non-controversial based on the classification of each comment in the second set of comments; and providing an indication that the second publication is determined to be controversial or non-controversial.

7. The computer-implemented method of claim 6, wherein the classifier is generated by performing supervised classification on the features included in a training set of comments included in the training data.

8. The computer-implemented method of claim 7, further comprising:

determining a number of features to use in the classifier to yield a threshold classification performance for the classifier.

9. The computer-implemented method of claim 7, wherein a number of features used for performing the supervised classification is based on at least one evaluation metric selected from a group comprising: F-measure, receiver operating characteristic (ROC) curve, and Matthews Correlation Coefficient.

10. The computer-implemented method of claim 7, wherein the features include semantic features and linguistic features.

11. A non-transitory computer readable medium storing instructions causing a processor to:

receive, for each of a plurality of publications, a set of comments provided for the publication;

receive training data that specifies controversial features;

for each comment included in each set of comments, identify i) at least one controversial feature included in the comment, or ii) at least one non-controversial feature included in the comment, the identification being based on the training data;

generate a controversy classifier that i) accepts, as input, a particular set of comments for a particular publication and ii) produces, as output and for each comment in the particular set of comments, data indicating a measure of controversy for the comment;

receive and store a second set of comments about a second publication;

extract features associated with the second set of comments;

using the extracted features and the classifier, classify each of the second set of comments as controversial or non-controversial;

based on a percentage of comments classified as controversial, determine whether the second publication is controversial; and provide an indication that the second publication is determined to be controversial or non-controversial.

12. The non-transitory computer readable medium of claim 11, wherein the extracted features are selected from the group comprising: semantic features, linguistic features, visual features, audio features, and word ontologies.

13. The non-transitory computer readable medium of claim 11, wherein at least a portion of the plurality of comments were provided by distinct entities.

* * * * *